Jan. 12, 1943. C. HEDDON 2,307,836
WEED GUARDED FISH LURE
Filed May 13, 1941
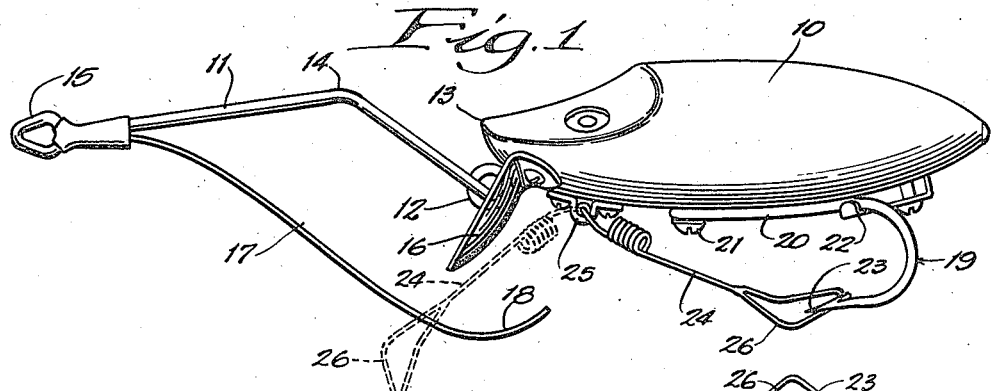
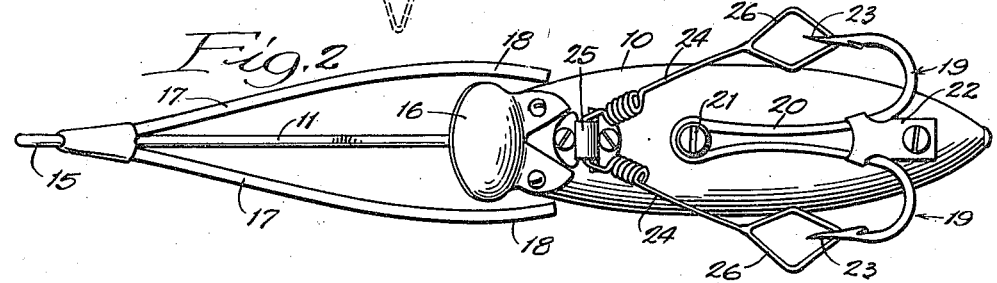
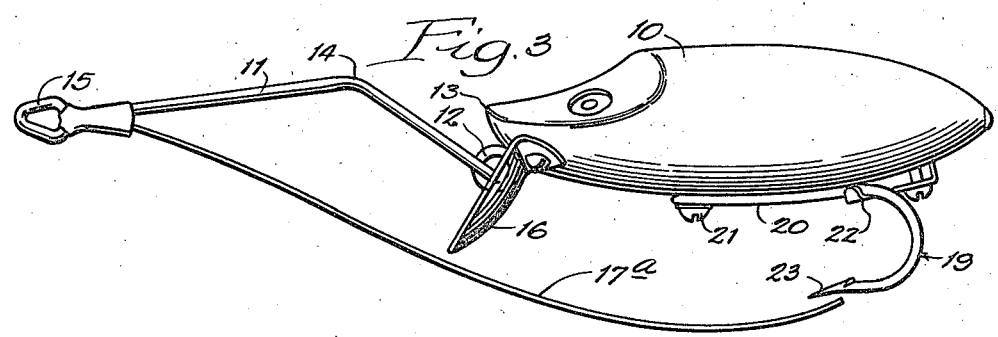
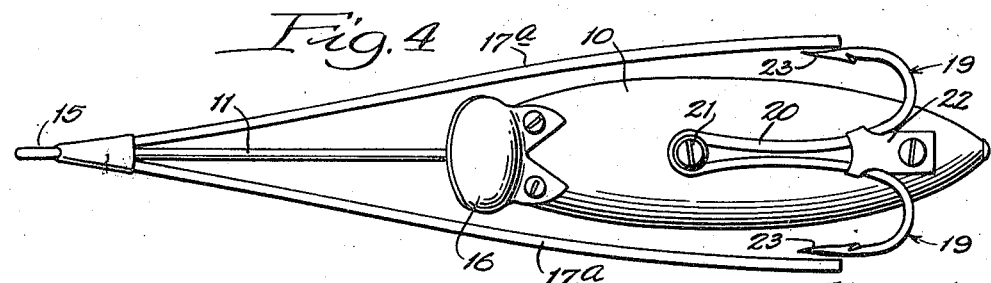
Inventor:
Charles Heddon,
By Banning & Banning
Attorneys.

Patented Jan. 12, 1943

2,307,836

UNITED STATES PATENT OFFICE 2,307,836

WEED GUARDED FISH LURE

Charles Heddon, Dowagiac, Mich., assignor to James Heddon's Sons, Dowagiac, Mich., a corporation of Michigan Application May 13, 1941, Serial No. 393,205

5 Claims. (Cl. 43—39)

In the manufacture of fish baits of many different types, it has long been the practice to provide means for weed guarding the hooks by the employment of resilient spring prongs or the like, which protect the barbed tips of the hooks and are adapted to yield under the impact of a fish's strike.

I now propose to guard the forward end of the bait body by the provision of a leader of the specific type shown in the copending application of Joseph McArthur, Serial No. 340,935, filed June 17, 1940, and which has eventuated in Patent No. 2,270,070, issued January 13, 1942, but in the case of plug baits with which I am familiar, the means provided for guarding the bait as a whole are inadequate, in that certain portions of the entire bait afford outstanding obstructions which are likely to become befouled by weeds or the like, so that it becomes impossible to use a plug bait body in heavily weeded waters where game fish are most often accustomed to inhabit, so that it becomes essential to make provision for weed guarding the entire bait and not merely certain portions thereof.

The object of the present invention, therefore, is to provide a lure which in its entirety will afford deflecting means for spreading or opening up an unobstructed path through a weed bed so that no portion of the entire lure will afford points of lodgment for the weeds, and this without impairing the effectiveness of the lure in hooking fish which strike the bait body.

In designing the lure of the present invention, account is also taken of the fact that, whether the fish strikes from the side or from behind, three triangularly spaced points of resistance for the fish's jaws will be afforded by the bait body in conjunction with the laterally and downwardly projecting hook points, so that in closing his jaws upon the bait body the weed guarding elements will yield to permit the hook points to be driven into the flesh, thereby hooking the fish on the strike itself rather than by a jerk on the line imparted through the rod.

As to the form of the bait body and the arrangement of the hooks, I prefer to employ the body and hook arrangement shown and described in my copending application Serial No. 359,711, filed October 4, 1940, with a leader of the character employed in the McArthur application aforesaid, but in neither of the devices shown in these respective applications is provision made for the weed guarding of the lure as a whole, so that it becomes essential to employ the respective devices in combination in order to fully attain the weed guarding effect provided for by the lure of the present invention.

It will be understood that it is not the intention, however, to limit the present invention to the combined use of the specific features above mentioned, since the principles embodied in the present invention may find exemplification in the specifically different forms of construction.

Further objects and details will appear from the description of the invention in conjunction with the accompanying drawing, wherein—

Figure 1 is a side elevation of a fish lure embodying the features of the present invention;

Fig. 2 is a view showing the under side of the lure of Fig. 1;

Fig. 3 is a side elevation of a modified form of construction; and

Fig. 4 is a view showing the under side of the lure of Fig. 3.

Referring to Figs. 1 and 2, the lure comprises a plug bait body 10 of the conventional ovate formation, which trails behind a leader 11 which is flexibly linked at its rear end to an eye 12 extending from a point beneath the nose 13 of the bait body. The leader 11, in the form shown, is bent upwardly near its rear end to afford an elbow or hump 14 which, when the lure is being trailed through the water, will ordinarily stand in sufficiently elevated relation to the nose or tip of the body 10 to deflect weeds or other obstructions upwardly and over the smooth sloping surface of the body, so that the same will not be caught and lodged in the space between the leader and the nose or tip of the body.

While for purposes of illustration the leader is shown as being formed of a section of wire angularly bent to afford the hump in question, it will be understood that an equivalent configuration, affording a hump of similar character and disposed in such a way as to subserve the deflecting function, may be employed in lieu of the bent wire herein illustrated.

The leader at its forward end terminates in an elongated eye 15 which affords a line tie and is preferably tapered toward its forward end to reduce to a minimum the possibility of lodgment of fine weeds or grass at the tip end of the leader.

The body is provided at its forward end with a lip or chin piece 16 of conventional character, which extends downwardly and forwardly from the tip of the body, and in order to guard the chin piece from weeds or the like, the leader is provided with forwardly converging guard prongs 17, which diverge in a rearward direction downwardly and laterally, and are recurved at their rear tip ends 18 behind and below the chin piece 16, so that it will be protected at all times irrespective of the rolling or oscillation of the body with respect to the freely linked leader and irrespective of diving, darting, or other erratic movements of the body.

The body in the preferred form shown is provided with twin hooks 19, the shanks 20 of which extend in closely adjacent parallel relation beneath the body and may be rigidly secured thereto in any desired manner, but as shown are secured at their forward ends by a screw 21 or similar attachment, and at their rear ends by a clip 22 or the like, so that the rigidly fastened hook points extend downwardly and outwardly from the body, which, together with the diverging hooks, provide three points of resistance to the strike of the fish's jaws.

By attaching the hooks rigidly to the under side of the body in the manner indicated, the recurved barbed hook points 23 will diverge laterally and downwardly from the body so that the hook points will present themselves in unyielding relation to the bait body at all times, and a fish's jaws, striking into the bait body, will necessarily force one or both of the hook points into the flesh by the heavy impact of the strike and without further effort on the part of the fisherman to set the hooks. With the hook points thus immovably fixed, they are adequately guarded by suitable means designed to afford protection at all times and irrespective of movements imparted to the body.

In Figs. 1 and 2, I have shown the individual hook points guarded by means of resilient prongs 24 which are converged forwardly and are connected at their forward ends, which pass through and are hinged within a clip 25 which permits the two guard prongs as a unit to be thrown back into the dotted line position shown in Fig. 1, when the prongs are released from contact with the barbed tips of the hooks.

In the form shown, each guard prong at its rear tip end is provided with a small wire loop 26, which is sprung under the pointed tip of the associated hook, and each prong near its forward end is formed to afford a coil spring section 26ᵃ which adds to the resiliency of the prongs, which must of necessity be of comparatively delicate construction.

The leader prongs 17 are so disposed that their rear diverging ends underlie the forward end of the body and stand substantially beneath the forward ends of the hook guard prongs 24, so that the latter will continue to supplement the weed deflecting function performed by the leader prongs, with the result that the two sets of guards in unison will effectively prevent weeds from engaging and befouling any portion of the lure either from above or below the same.

In Figs. 3 and 4 I have shown a modified form of construction intended to accomplish a similar result, and in this case the leader prongs 17ᵃ have been extended and diverged sufficiently to overlap the tips of the hooks so that the guarding function is performed solely by the leader prongs, and the hook prongs in this instance have been dispensed with. In other respects, however, the lure of Figs. 3 and 4 is similar to the one first described.

Other modifications in the shape and arrangement of the weed guarding members may be made without departing from the spirit of the invention, which resides in the employment of weed guarding means of any adequate character which diverge from a point in advance of the body of the lure and provide for the protection throughout the entire lure of all protruding portions thereof which might otherwise afford obstructions for the accumulation of weeds or the like, and at the same time afford the necessary resiliency to yield under the strike of a fish.

By hinging the hook guard prongs in the manner described, and by providing each of the prongs with a coil spring section, and by limiting the inward hinging movement of the prong structure as a whole, the wire loops 26, when cocked behind the hook points, will be under sufficient spring tension to maintain their intended position, but upon the strike of a fish they will be readily displaced, which permits the guard structure to swing forward into a position where they will afford no interference to the hooks.

Because of the comparatively delicate type of structure, it is desirable to provide a combination which makes it possible for the guards to swing or be swung away from the hooks and the jaws of the fish in combination with a coil spring area, which affords the necessary yielding to expose the hook points, and these features have been found to be most valuable in preventing the weed guarding prongs from becoming bent out of alignment or position more particularly when a fisherman is undertaking to remove a struggling fish from the hooks.

The arrangement of the guard wire, which is mounted upon and extends rearwardly from the forward part of the leader, possesses particular value, in that the guard structure does not interfere with the swimming action of the bait in any way which would occur if the guard wires were mounted directly upon the forward end of the bait body itself. Experiments have shown that where weed guarding wires are mounted on the forward structure of the bait, or too close to the chin piece or similar element which affords its swimming action, the guard wires will more or less seriously interfere with the action of the bait by disturbing the water immediately in front thereof.

The present structure as a whole is one which provides complete protection against befouling at all points, without, however, interfering in any way with the normal or intended movement of the bait body, and at the same time the guard features of the present invention are so disposed that they overlap and supplement each other in such a way as to adequately protect the bait in all positions with respect to the leader, which at all times maintains itself in the line of draft, while permitting the bait body to swim, dive or dart in various directions in the intended manner.

I claim:

1. In a fish lure, the combination of a body having a downwardly extending lip, a fish hook rigidly attached to the body and mounted thereon so that the point of said hook is located below the medial longitudinal plane of the body, means for weed guarding said hook, a leader and a rearwardly diverging forked structure secured to and extending from said leader, said forked structure being adapted to protect the downwardly extending lip of the bait body from becoming fouled on weeds or other obstructions, and cooperating with the guarding means for the hook in weed guarding the lure as a whole.

2. In a fish lure, the combination of a body having a downwardly extending lip, a fish hook rigidly attached to the body and mounted thereon so that the point of said hook is located below the medial longitudinal plane of the body, means for weed guarding said hook, a leader freely linked to the body and a guard structure secured to and extending from said leader, said guard structure having a sufficient lateral spread to permit free swinging of the body while at all times preventing the downwardly extending lip of the bait body from becoming fouled on weeds or other obstructions, and in all positions cooperating with the guarding means for the hook in weed guarding the lure as a whole.

3. In a fish lure, the combination of a plug body provided near its forward end with a depending chin piece, a leader extending forwardly from the body, a hook rigidly secured to the plug body and having its recurved barbed point projecting outwardly from the body, a pair of weed guarding prongs converging at their forward ends and secured to the leader in advance of the chin piece and diverging rearwardly and downwardly therefrom in position to guard the forward end of the body and chin piece, and a yieldable weed guarding prong secured at its forward end to the body at a point above the leader prongs and normally extending at its rear end to a position adjacent to the hook point, the leader guard and hook guard being adapted in unison to weed guard the entire lower portion of the lure.

4. In a fish lure, the combination of a plug bait body provided with hooks rigidly secured to the body and having their forwardly recurved barbed points laterally and downwardly projecting from the body, a pair of yieldable hook guard prongs converging forwardly and secured to the under side of the body and having their divergent rear ends normally held in adjacent relation to the respective hook points, a chin piece secured to and depending from the forward end of the body, a leader freely linked to the forward end of the body and terminating at its forward end in a line tie and provided with an upstanding intermediate hump adapted to deflect weeds up and over the tip end of the body, and a pair of rearwardly projecting guard prongs secured to the forward portion of the leader and having their divergent rear ends extending below the chin piece and in position to cooperate with the hook guard prongs in deflecting weeds laterally and downwardly away from the lower portion of the lure throughout all portions thereof.

5. In a fish lure, the combination of a plug bait body provided with hooks rigidly secured to the body and having their forwardly recurved barbed points laterally and downwardly projecting from the body, a pair of yieldable guard prongs converging forwardly and secured to the under side of the body near the forward end thereof and having their divergent rear ends normally held in adjacent relation to the respective hook points, a chin piece secured to and depending from the forward end of the body, a leader freely linked to the forward end of the body and terminating at its forward end in a line tie, and a pair of rearwardly projecting guard prongs secured to the forward portion of the leader and having their divergent rear ends extending below the chin piece and in position to cooperate with the hook guard prongs in deflecting weeds laterally and downwardly away from the lower portion of the lure throughout all portions thereof.

CHARLES HEDDON.